US012762413B2

(12) United States Patent
Lattner

(10) Patent No.: US 12,762,413 B2
(45) Date of Patent: Oct. 13, 2026

(54) ARTIFICIAL NEURAL NETWORK FOR GENERATING A REPRESENTATION OF FIRST AND SECOND INPUT SIGNALS

(71) Applicant: Sony Group Corporation, Tokyo (JP)

(72) Inventor: Stefan Lattner, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 1423 days.

(21) Appl. No.: 17/441,290

(22) PCT Filed: Feb. 28, 2020

(86) PCT No.: PCT/EP2020/055270
§ 371 (c)(1),
(2) Date: Sep. 21, 2021

(87) PCT Pub. No.: WO2020/200594
PCT Pub. Date: Oct. 8, 2020

(65) Prior Publication Data
US 2022/0180208 A1 Jun. 9, 2022

(30) Foreign Application Priority Data
Mar. 29, 2019 (EP) .................................... 19166343

(51) Int. Cl.
*G06N 3/088* (2023.01)
*G06F 17/16* (2006.01)
*G10L 25/30* (2013.01)

(52) U.S. Cl.
CPC ............ *G06N 3/088* (2013.01); *G06F 17/16* (2013.01); *G10L 25/30* (2013.01)

(58) Field of Classification Search
CPC ................................ G06F 17/16; G06N 3/088
See application file for complete search history.

(56) References Cited

U.S. PATENT DOCUMENTS 8,158,870 B2 4/2012 Lyon et al.
2008/0300702 A1 12/2008 Gomez et al.

FOREIGN PATENT DOCUMENTS

WO 2010/043258 A1 4/2010
WO WO-2019040132 A1 * 2/2019 ............. G06N 3/084

OTHER PUBLICATIONS

Purwins et al. "Deep Learning for Audio Signal Processing" (Year: 2019).*

(Continued)

*Primary Examiner* — Van C Mang
(74) *Attorney, Agent, or Firm* — XSENSUS LLP

(57) ABSTRACT

A computer-implemented method of training an artificial neural network (ANN) by generating one or more learned parameters for use during a subsequent inference phase of the trained ANN, comprises providing training data representing first and second input signals, the second input signal exhibiting one or more transformations relative to the first signal selected from a set of transformations; using the ANN and in response to the one or more parameters, generating a magnitude and phase representation of each of the first and second input signals; and training the one or more parameters, in dependence upon a constraint which causes the magnitude representation of the first input signal and the magnitude representation of the second input signal to tend to become more similar to one another, the training step comprising: detecting an error signal; and updating the one or more parameters in dependence upon the error signal.

20 Claims, 7 Drawing Sheets

(56) References Cited

OTHER PUBLICATIONS

Lattner, "Learning Complex Basis Functions for Invariant Representations of Audio" (Year: 2019).*
Worrall et al., "Harmonic Networks: Deep Translation and Rotation Equivariance", Computer Vision and Pattern Recognition, Apr. 11, 2017, 15 pages.
Dörfler et al., "Basic Filters for Convolutional Neural Networks Applied to Music: Training or Design?", Machine Learning, Sep. 19, 2018, pp. 1-24.
Bertin-Mahieux et al., "Large-Scale Cover Song Recognition Using the 2D Fourier Transform Magnitude", International Society for Music Information Retrieval, 2012, 6 pages.
Agrawal et al., "Efficient Similarity Search In Sequence Databases", IBM Almaden Research Center, 1993, 15 pages.
Keogh et al., "Clustering of Time Series Subsequences is Meaningless: Implications for Previous and Future Research", Computer Science & Engineering Department, University of California, 2005, 20 pages.
Krishnamoorthi et al., "Selective Combinational Encryption of Gray Scale Images using Orthogonal Polynomials based Transformation", International Journal of Computer Science and Network Security, May 2008, vol. 8, No. 5, pp. 195-204.
Dörfler et al., "Machines Listening to Music: The Role of Signal Representations in Learning from Music", Department of Telecommunications, Brno University of Technology, Mar. 22, 2019, pp. 1-10.
Matsuo et al., "Transform Invariant Auto-Encoder", Computer Vision and Pattern Recognition, Sep. 12, 2017, 6 pages.
Memisevic et al., "Learning to Relate Images", Department of Computer Science and Operations Research, University of Montreal, pp. 1-19.
Hadjeres et al., "Deep Rank-Based Transposition-Invariant Distances on Musical Sequences", Information Retrieval, Sep. 3, 2017, pp. 1-13.
Lostanlen et al., "Deep Convolutional Networks on the Pitch Spiral for Music Instrument Recognition", 17th International Society for Music Information Retrieval Conference, 2016, 7 pages.
Paulraj et al., "A Subspace Rotation Approach to Signal Parameter Estimation", Proceedings of IEEE, Jul. 1986, vol. 74, No. 7, pp. 1044-1046.
Peyre et al., "Best Basis Compressed Sensing", IEEE Transactions On Signal Processing, May 2010, vol. 58, No. 5, pp. 2613-2621.
Memisevic et al., "Learning Invariant Features by Harnessing the Aperture Problem", Proceedings of the 30th International Conference on Machine Learning, 2013, vol. 28, 9 pages.
Roy et al., "Direction-of-Arrival Estimation by Subspace Rotation Methods—Esprit", IEEE International Conference on Acoustics, Speech, and Signal Processing (ICASSP), 1986, pp. 2495-2498.
Lattner et al., "Learning Transposition-Invariant Interval Features from Symbolic Music and Audio", Arxiv.Org, 19th International Society for Music Information Retrieval Conference, Feb. 4, 2019, 8 pages.
Zou et al., "Deep Learning of Invariant Features via Simulated Fixations in Video", pp. 1-9.
Hung et al., "Learning Disentangled Representations for Timber and Pitch in Music Audio", Arxiv.Org, Nov. 8, 2018, 10 pages.
Zhang et al., "A Deep Representation for Invariance And Music Classification", Center for Brains, Minds and Machines (CBMM), Mar. 17, 2014, 6 pages.
International Search Report and Written Opinion mailed on Jun. 12, 2020, received for PCT Application PCT/EP2020/055270, Filed on Feb. 28, 2020, 11 pages.

* cited by examiner

Training the Classification System

ARTIFICIAL NEURAL NETWORK FOR GENERATING A REPRESENTATION OF FIRST AND SECOND INPUT SIGNALS

CROSS-REFERENCE TO RELATED APPLICATIONS

The present application is based on PCT filing PCT/EP2020/055270, filed Feb. 28, 2020, which claims priority to EP 19166343.4, filed Mar. 29, 2019, the entire contents of each are incorporated herein by reference.

BACKGROUND

Field

This disclosure relates to artificial neural networks.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly or impliedly admitted as prior art against the present disclosure.

As an example of a processing task (and noting that the present techniques can relate to signals other than audio signals), music information retrieval (MIR) techniques analyse music in the symbolic and audio domain for different tasks. For example, a common MIR task is the alignment of two audio tracks performing the same music piece but with different tempi (for example, having been captured in respective live performances). Another MIR task is the detection of (potentially mutually transposed) cover songs in a corpus of songs. Other tasks include classification of audio and symbolic scores, like genre classification, mood classification, assigning songs to composers, and so on. Further tasks involve rhythm detection, key estimation, detection of (potentially transposed) repeated sections, or learning the statistics of a corpus for music generation.

Most such tasks suffer from a high variance of music in specific dimensions dominating and disguising the dimensions of interest. For example, transposition is a musical concept to which most human listeners are invariant, meaning a musical motif can usually be recognized independent of the absolute values of pitches. This invariance to transposition in humans provides evidence that absolute pitch is a dimension which has high variance in music and nature, but is unhelpful in specific classification tasks (e.g., identifying melodies or spoken words).

Another dimension which hinders generalization in some tasks is tempo. For example, in the alignment task mentioned above, it is necessary to compare small windows of audio with one another to detect similarities as local cues for global alignment. When comparing in a representation space which is variant to tempo, similarities could be overseen when the tempo of both audio files varies. Varying tempo is also a problem when it comes to detection of rhythms (which are usually defined tempo-invariant), or when we want to learn from audio for music generation.

Furthermore, when learning representations from music as an intermediate step for many MIR tasks, the signal is usually windowed, and representations are learned from the respective windows. However, as representations are variant to the absolute time shift of a signal in a window, neighbouring representations in time often differ from each other substantially, even when they describe overlapping windows, i.e., half of the signal is identical but shifted. This behaviour is not only counterintuitive but also leads to problems in MIR, like that the window size and chosen overlap influences the performance of the method. Furthermore, as repeating musical entities (like bars) are generally not aligned with the windows, perceptually similar musical input can lead to very different representations.

The variance of computer models to musical dimensions as described above generally leads to problems in generalization (as models have to learn the "same thing" many times when it appears shifted in such dimensions), to bigger models, more memory consumption and overall to less efficient and slower processing in MIR tasks.

SUMMARY

The present disclosure provides a computer-implemented method of training an artificial neural network (ANN) by generating one or more learned parameters for use during a subsequent inference phase of the trained ANN, the method comprising:

providing training data representing first and second input signals, the second input signal exhibiting one or more transformations relative to the first signal selected from a set of transformations;

using the ANN and in response to the one or more parameters, generating a magnitude and phase representation of each of the first and second input signals; and training the one or more parameters, in dependence upon a constraint which causes the magnitude representation of the first input signal and the magnitude representation of the second input signal to tend to become more similar to one another, the training step comprising:

detecting an error signal; and updating the one or more parameters in dependence upon the error signal.

The present disclosure also provides an audio processing system comprising:

an analyser configured to generate magnitude and phase representations of first and second input signals, the phase representations depending upon one or more transformations, selected from a set of transformations, between the first and second input signals and the magnitude representations being independent of the one or more transformations;

an output configured to acquire the magnitude and phase representations of the first and second input signals and to output one or both of:

a phase difference between phases represented by the respective phase representations, the phase difference being indicative of the one or more transformations between the first and second input signals; and one or more of the magnitude representations, the one or more magnitude representations being indicative of the first and second input signals in the absence of the transformation.

The present disclosure also provides an auto-encoder comprising:

one or more encoding layers;

one or more representational layers; and one or more decoding layers;

in which the one or more encoding layers, the one or more representational layers and the one or more decoding layers are configured to cooperate to provide a representation of first and second input signals at the one or more representational layers having a first component which is dependent upon one or more transformations, of a set of transformations, between the first and second input signals and a second component which is independent of the one or more transformations.

The present disclosure also provides a method of signal processing comprising:

generating a representation of first and second input signals, the representation having a first component which is dependent upon one or more transformations, of a set of transformations, between the first and second input signals and a second component which is independent of the one or more transformations.

Further respective aspects and features of the present disclosure are defined in the appended claims.

It is to be understood that both the foregoing general description and the following detailed description are exemplary, but are not restrictive, of the present technology.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE PREFERRED EMBODIMENTS

Figure 1:
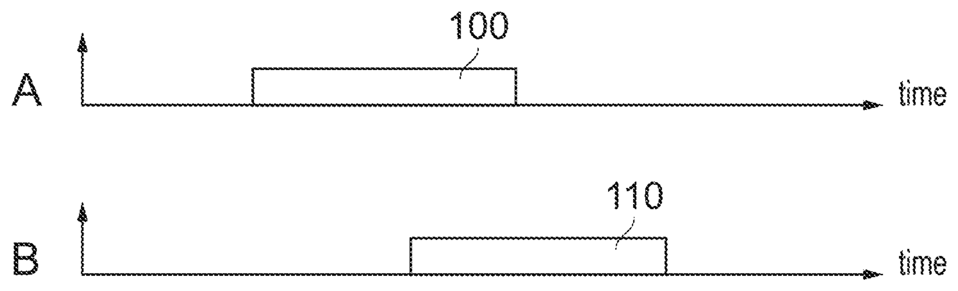
FIG. 1 schematically illustrates a signal transformation.

Referring now to the drawings, FIG. 1 schematically illustrates an example of a signal transformation between a first signal A and a second signal B. Time is represented as running from left to right as drawn. A signal portion 100 is substantially identical but displaced in time as between the signals A and B, so that the portion 100 occurs at a different time, as a portion 110, in the signal B. This is an example of a transformation involving a time shift. In the example context of audio signals, this would relate to the same (or almost exactly the same) audio or musical theme occurring at different times in the two signals A and B. This is, however, just one example of a transformation to which the present techniques are relevant. Other examples (for the sake of the present description, in the context of audio signals) relate to differences in pitch and differences in tempo as between different audio or musical themes.

Note that although audio signals can be expressed in the time domain, and such types of signals are useful in the methods to be described here, another expression of an audio signal is in the time-frequency domain such as a so-called constant Q transform (CQT) signal, a so-called Mel Spectrogram signal or a so-called Fourier Spectrogram signal. Signals of this type are particularly suited to the methods described here.

A human listener is well equipped to detect that two audio sequences relate to the same underlying or musical or other theme independently of such a transformation. Indeed, many human listeners may not even notice that a pitch transformation has taken place or that the tempo is different. However, for automated processing systems, the recognition of such transformations can be challenging.

Figure 2:
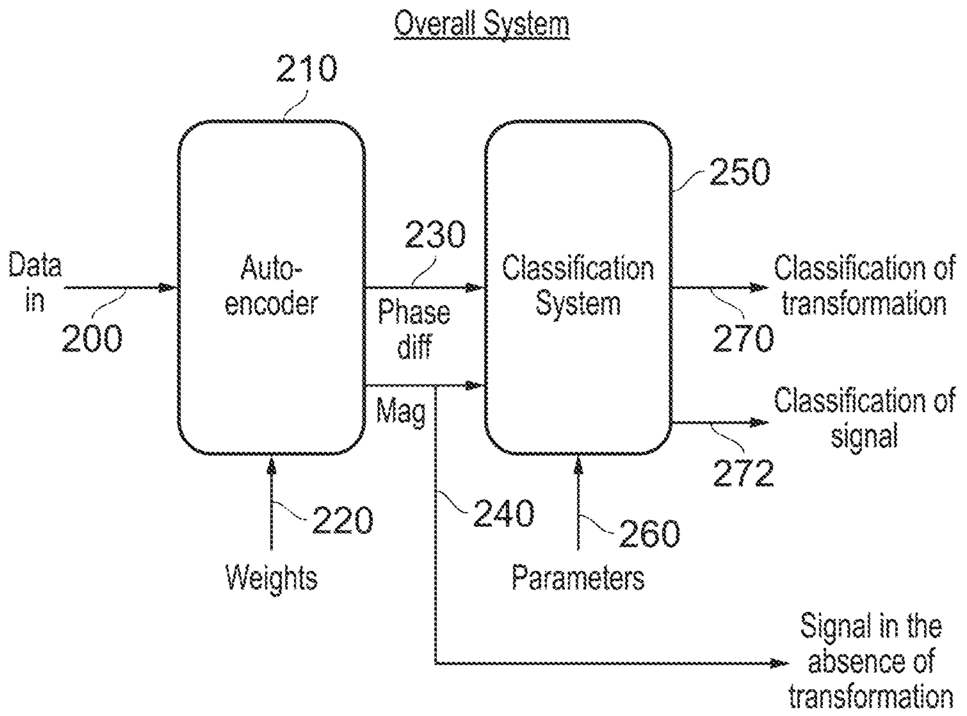
FIG. 2 schematically illustrates an audio processing system.

FIG. 2 schematically illustrates an audio processing system configured to receive input data 200, for example representing samples of first and second input signals (such as the signals A and B discussed above). The input data is processed by a so-called auto-encoder 210 responsive to a set of encoding parameters such encoding weights 220 established during a training process to be discussed below.

The auto-encoder outputs one or both of a phase difference 230 and a magnitude signal 240. The technical significance and derivation of these will be discussed below.

The phase difference 230 may be passed to a classification system 250 such as another artificial neural network (ANN) (the auto-encoder being an example of an ANN) which, in response to further parameters 260 can generate a classification 270 of a transformation (or indeed more than one transformation) which exists as between the two input signals provided to the auto-encoder.

The magnitude signal 240 provides an indication of the signal content (such as a musical theme) in the absence of the transformation. This can be provided as a separate output and/or can be provided as an additional input to the classification system 250, the classification system 250 being trained to detect classifications 272 of the signal in the absence of the transformation (for example, to recognise a musical theme).

Another possible use of the detected transformation 270 and/or the detected phase difference 230 is that it can be used to transform a third signal. For example, a tempo change, a time shift, or a pitch shift could be applied to a third signal by using a magnitude representation of the third signal and applying a phase shift as detected to its phase representation, before decoding the third signal using techniques to be described below.

The auto-encoder 210 therefore provides an example of an audio processing system to detect one or more transformations between first and second input signals, the transformations being selected from a set of transformations, the system comprising: an artificial neural network (ANN) trained according to the method to be described below using the set of transformations; an output configured to acquire the phase representations of the first and second input signals and to output one or both of: a phase difference 230 between phases represented by the respective phase representations, the phase difference being indicative of the detected transformation; and one of the magnitude representations 240, the output magnitude representation being indicative of the first and second input signals in the absence of the transformation.

The system of FIG. 2 may also comprise a further ANN 250 configured to detect one or more transformations in response to the phase difference.

The auto-encoder 210 (optionally with the classification system 250) therefore provides an example (using the techniques to be discussed below) of an audio processing system comprising:

an analyser (such as an ANN for example) configured to generate magnitude and phase representations of first and second input signals, the phase representations depending upon one or more transformations, selected from a set of transformations, between the first and second input signals and the magnitude representations being independent of the one or more transformations;

an output configured to acquire the magnitude and phase representations of the first and second input signals and to output one or both of:

a phase difference 230 between phases represented by the respective phase representations, the phase difference being indicative of the one or more transformations between the first and second input signals; and one or more of the magnitude representations 240, the one or more magnitude representations being indicative of the first and second input signals in the absence of the transformation.

Figure 3:
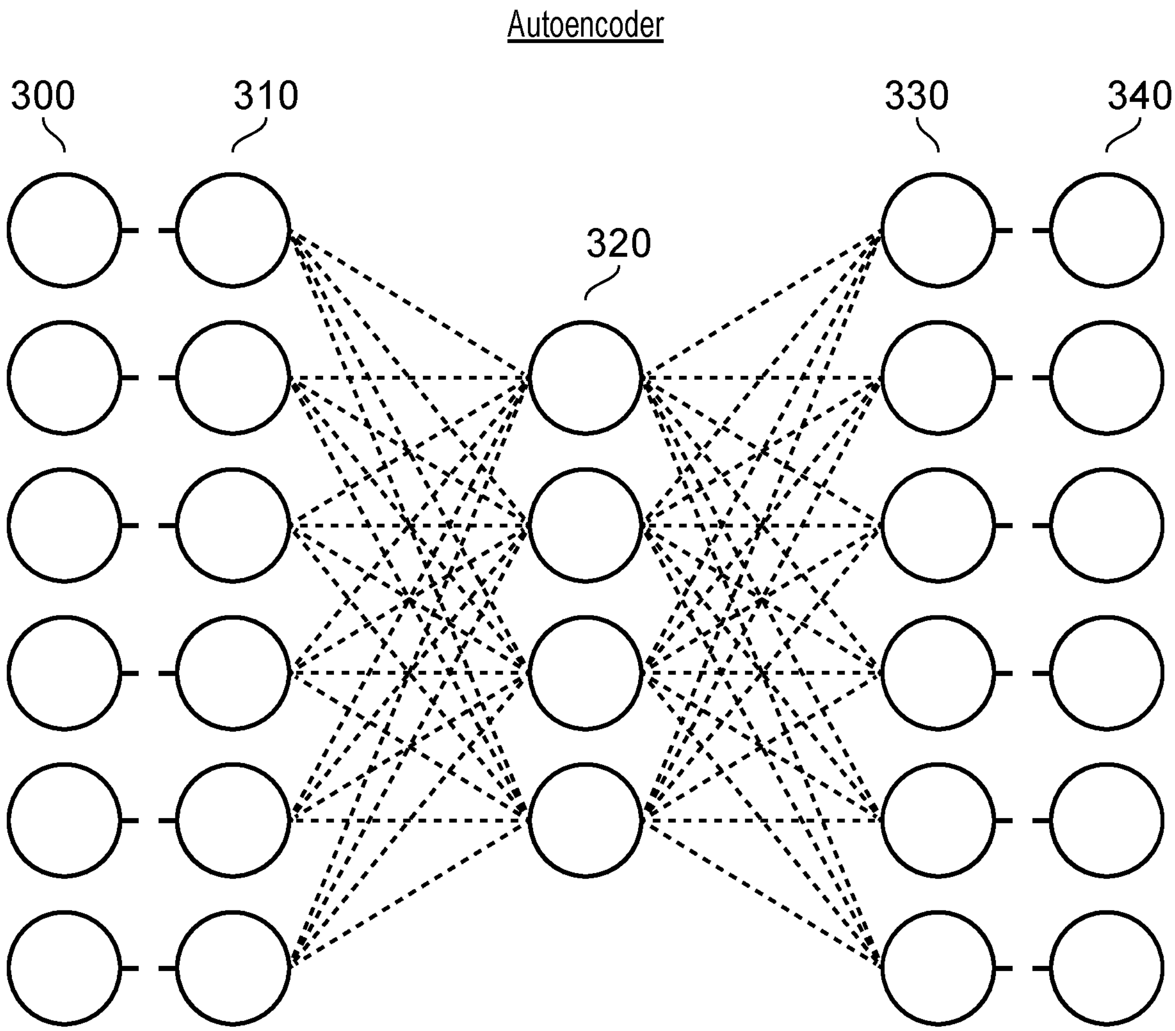
FIG. 3 schematically illustrates an autoencoder.

FIG. 3 schematically illustrates an auto-encoder. This is an example of an ANN and has specific features which force the encoding of input signals into a so-called representation, from which versions of the input signals can then be decoded.

In one type of example, the auto-encoder may be formed of so-called neurons representing an input layer 300, one or more encoding layers 310, one or more representation layers 320, one or more decoding layers 330 and an output layer 340. In order for the auto-encoder to encode input signals provided to the input layer into a representation that can be useful for the present purposes, a so-called "bottleneck" is included. In the particular example shown in FIG. 3, the bottleneck is formed by making one or more representational layers 320 smaller in terms of their number of neurons then the one or more encoding layers 310 and the one or more decoding layers 330. In other examples, however, this constraint is not required, but other techniques are used to impose a bottleneck arrangement, such as selectively disabling certain nodes at the encoding and/or decoding layers. In general terms, the use of a bottleneck prevents the auto-encoder from simply passing the inputs to the outputs without any change. Instead, in order for the signals to pass through the bottleneck arrangement, encoding into a different form is forced upon the auto-encoder. In the example embodiments to be discussed here, the encoding is into a complex representation of real and imaginary parts at the representational layers(s) in response to the weighting parameters which control encoding by the one or more encoding layers and decoding by the one or more decoding layers, from which a so-called magnitude and phase representation can be derived analytically, as a function to be discussed below of the real and imaginary components at the one or more representational layers.

In the context of the present techniques, FIG. 3 provides an example of an auto-encoder comprising:

one or more encoding layers;

one or more representational layers; and one or more decoding layers;

in which the one or more encoding layers, the one or more representational layers and the one or more decoding layers are configured to cooperate to provide a representation of first and second input signals at the one or more representational layers having a first component which is dependent upon one or more transformations, of a set of transformations, between the first and second input signals and a second component which is independent of the one or more transformations.

Figure 4:
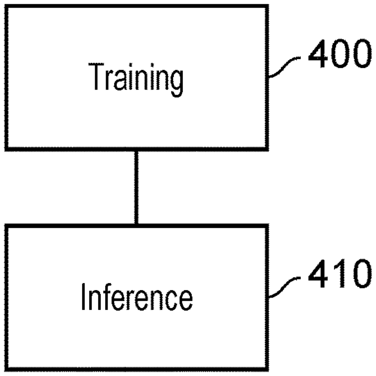
FIG. 4 is a schematic flowchart illustrating operations of an ANN.

FIG. 4 is a schematic flowchart illustrating operations of an ANN at a high level.

A key feature of the use of an ANN is that the operational parameters such as weights are acquired or trained during a training phase 400. During this phase, in the present example of the auto-encoder, pairs of signals with existing transformations are provided to the auto-encoder and the weight values are varied in response to the output of the auto-encoder in response to those training signals. This process will be described in much more detail below with reference to FIG. 5.

Then, in an inference phase 410, the trained weights are used so that the auto-encoder provides outputs in response to pairs of unknown signals which may or may not exhibit a transformation between them.

Figure 5:
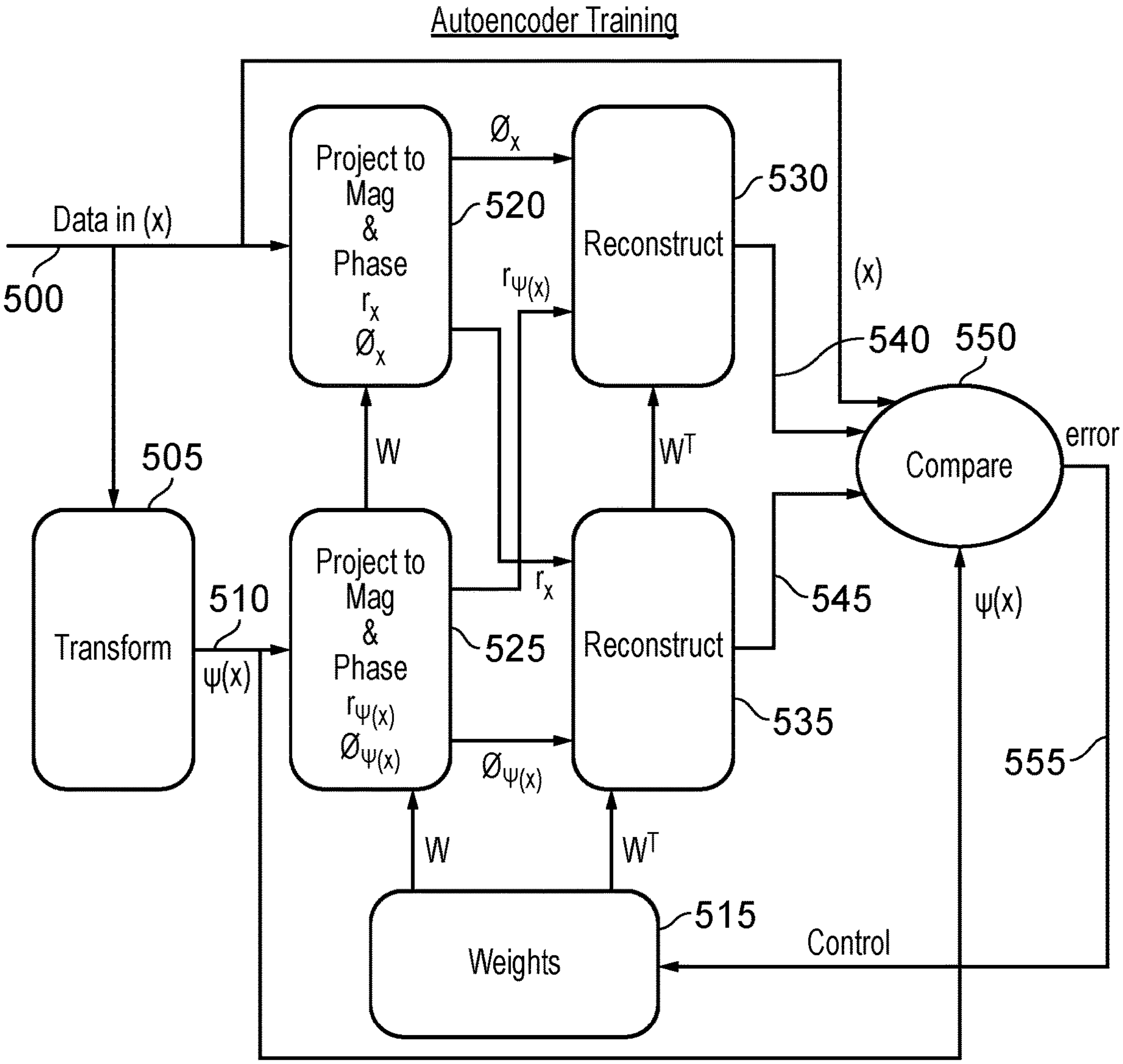
FIG. 5 schematically illustrates aspects of a training process.

FIG. 5 schematically illustrates aspects of a training process as applicable to the auto-encoder 210.

In the example of FIG. 5, training data is generated by taking an input signal x (500) and applying, for the purposes of training, a transformation (or indeed more than one transformation) of a set of orthogonal transformations (for example, an audio transformation such as a pitch transposition or shift, a tempo shift, a time shift or the like) by a transformation unit 505 to generate a second input signal ψ(x) (510). So, a pair of input signals x and ψ(x) (which may be, for example, audio signals) are provided to the auto-encoder during training.

In response to a set of weights such as weighting matrices provided by a weights module 515, each of the signals x, ψ(x) is projected to a real and imaginary representation and from there to a phase and magnitude representation. Note that the projection can be directly to the phase and magnitude representation or can be via the real and imaginary component representation. The equations relevant to this transformation to a respective magnitude representation $r_x$, and $r_{\psi(x)}$ and a respective phase representation $\phi_x$, and $\phi_{\psi(x)}$ using weighting matrices $W_{Re}$ for the real component and $W_{Im}$ for the imaginary component are:

$$r_x=\sqrt{((W_{Re}x)^2+(W_{Im}x)^2)};$$

$$r_{\psi(x)}=\sqrt{((W_{Re}\psi(x))^2+(W_{Im}\psi)(x))^2)};$$

$$\phi_x=\text{atan }2(W_{Re}x, W_{Im}x);\text{ and}$$

$$\phi_{\psi(x)}=\text{atan }2(W_{Re}\psi(x), W_{Im}\psi(x));$$

where atan 2 is the two-argument arctangent function

In particular, the signal x is projected to the phase and magnitude representations $r_x$ and $\phi_x$ by a projection 520 and the transformed signal ψ(x) is projected to a magnitude and phase representations $r_{\psi(x)}$ and $\phi_{\psi(x)}$ by a projector 525.

The use of the weighting matrix approach can be summarised as follows:

For a vector x of p input values, q outputs are generated as Wx representing a vector of real components or a vector of imaginary components. The weighting matrix is a p×q matrix. As a result of the training process these can represent in effect different respective frequency components of real and imaginary basis vectors. Each basis vector is encoded as a row in W. The real and imaginary components can then be transformed to magnitude and phase components, for example as $(r_{xA}r_{xB}r_{xC}r_{xD})$ and $(\phi_{xA}\ \phi_{xB}\ \phi_{xC}\ \phi_{xD})$ where A, B, C, D refer to different frequency components. The reconstruction process is carried out with respect to corresponding frequency components for the values of $r_x$, $\phi_x$, $r_{\psi(x)}$ and $\phi_{\psi(x)}$.

Then, for the purposes of the training process, the signals are passed to reconstruction modules 530, 535 which are responsive to the transposition $W^T$ of the respective weighting matrices W to reconstruct versions of the input signals.

However, the reconstruction takes place as between the phase representation of one of the pair of training input signals and the magnitude representation of the other of the pair of input signals, which is to say that a signal 540 is reconstructed from $\phi_x$ and $r_{\psi(x)}$; and a signal 545 is reconstructed from $r_x$ and $\phi_{\psi(x)}$. The reconstruction process is as follows:

$$x_{output1}=W^T_{Re}(r_{\psi(x)}\cdot\sin\phi_x)+W^T_{Im}(r_{\psi(x)}\cdot\cos\phi_x);$$

and the second output signal is derived as:

$$x_{output2}=W^T_{Re}(r_x\cdot\sin\phi_{\psi(x)})+W^T_{Im}(r_x\cdot\cos\phi_{\psi(x)});$$

where $W^T$ represents a transposition of the respective matrix W; $x_{output1}$ represents the signal 540 and $x_{output2}$ represents the signal 545. The "dot" in this example represents a Hadamard (entrywise) product.

Therefore, in these examples, the one or more parameters for the auto-encoder comprise respective weighting matrices controlling encoding by the one or more encoding layers and a transposition of the weighting matrices controlling decoding by the decoding layer.

The original signals x and ψ(x) along with the reconstructed signals 540, 545 are passed to a comparator 550 which generates an error signal 555 as follows:

$$\text{error}=\Sigma(x-x_{output1})^p+\Sigma(\psi(x)-x_{output2})^p \text{ where } p \text{ is at least 1.}$$

The error signal 555 is passed to the weights unit 515 to control variation of weighting matrices W and (therefore corresponding variation of the transposition $W^T$) for use in the next projection and reconstruction in the training process, for example using a gradient descent process in which weights are adjusted to reduce the error signal 555.

Figure 6:
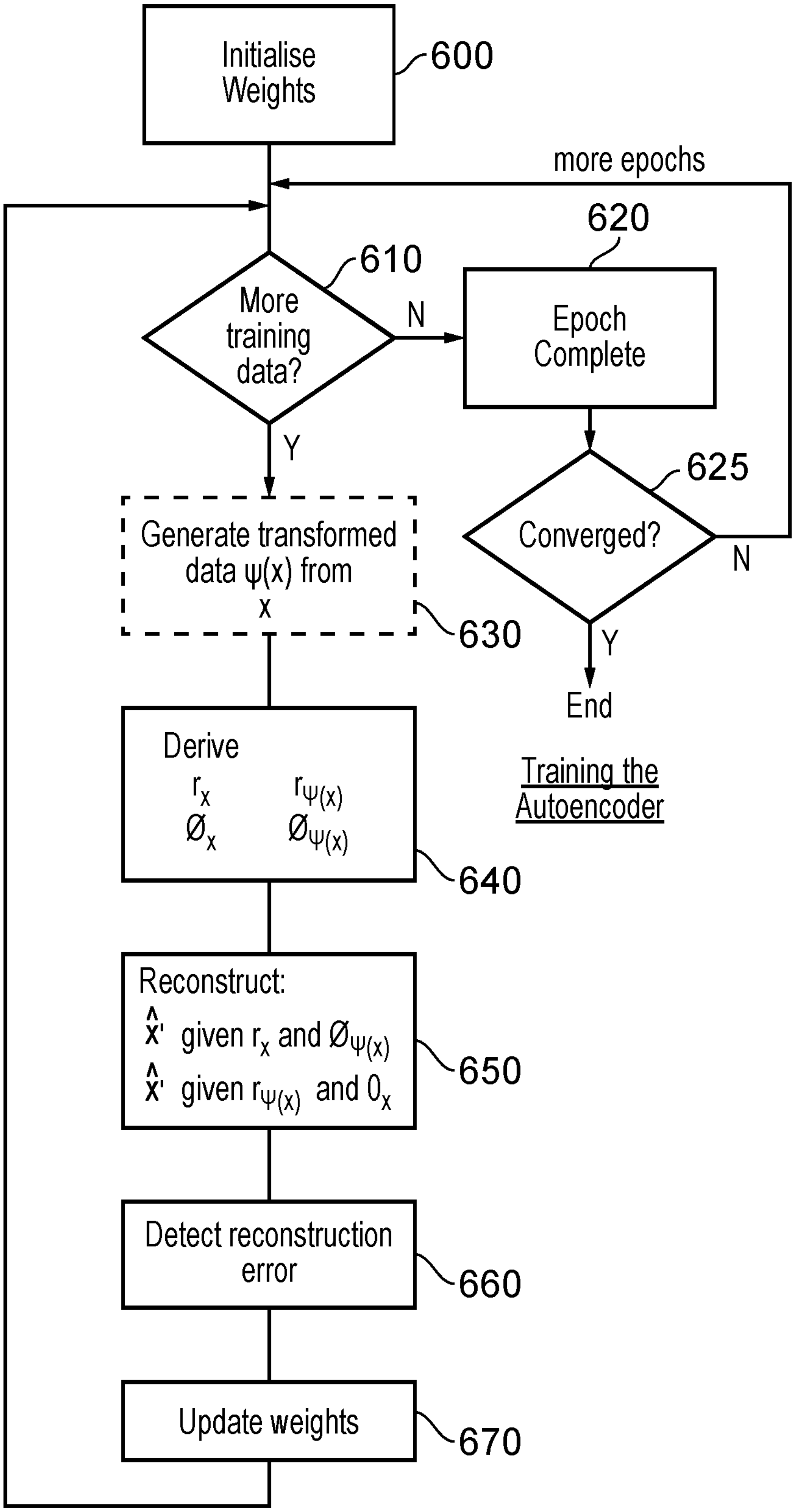
FIG. 6 is a schematic flowchart illustrating a method.

FIG. 6 is a schematic flowchart illustrating such a training method as applicable to the arrangement of FIG. 5.

At a step 600, the weights W held by the weights unit 515 are initialised to initial values. Then, a loop arrangement continues as long as there is (as established at a step 610) more training data x available for an epoch. Once there is no more training data available in a particular epoch (and training of an ANN may use, say, 50-10000 epochs), the epoch is complete at a step 620. If there are further epochs at a step 625, for example because the ANN parameters are not yet sufficiently converged, then the loop arrangement continues further via the step 610; if not then the process ends.

However, during the training process, at an optional step 630, the transformation unit 505 generates transformed data ψ(x) from x. Note that this step and indeed this unit are not required if pairs of signals exhibiting a relative transformation are already available. In either case, the step 630 or the use of already available such data provides an example of providing training data representing first and second input signals, the second input signal exhibiting one or more transformations relative to the first signal selected from a set of transformations such as a set of orthogonal transformations if the step 630 and the transformation unit 505 are used, this represents an example of generating the second input signal by applying a transformation to the first input signal.

Then, at a step 640, using the ANN and in response to one or more learned parameters (which will be used as discussed during a subsequent inference phase of the trained ANN), generating a magnitude $r_x$ and $r_{\psi(x)}$ and phase $\phi_x$ and $\phi_{\psi(x)}$ representation of each of the first and second input signals.

At a step 650, using the reconstruction units 530, 535, and in response to the one or more learned parameters (in this example $W^T$), generating a first output signal in dependence upon the magnitude representation of the first input signal and the phase representation of the second input signal and generating a second output signal in dependence upon the magnitude representation of the second input signal and the phase representation of the first input signal.

At a step 660, the comparator 550 detects the reconstruction error between at least one of the first and second output signals and at least one of the first and second input signals. Finally, at a step 670 the weights unit 515 updates the one or more learned parameters such as W in dependence upon the reconstruction error.

More generally, the steps 650-670 can be viewed as a process of:

training the one or more learned parameters, in dependence upon the reconstruction error and in dependence upon a constraint which causes the magnitude representation of the first input signal and the magnitude representation of the second input signal to tend to become more similar to one another, the training step comprising:

detecting 660 an error signal; and updating 670 the one or more learned parameters in dependence upon the error signal.

In other words, the arrangement of the step 650 whereby the magnitude and phase are "swapped" for reconstruction is just one example of more general technique whereby the two magnitude representations are constrained by the training process to be or become more similar. Other techniques could include for example:

- averaging the two magnitude components and using the averaged result for both at reconstruction;
- applying a penalty term in the error (cost) function which penalises differences between the two magnitude components;
- otherwise constraining the two magnitude components so as to reduce differences between them before reconstruction.

In each of these arrangements, the effect of the training process is that a constraint is applied which causes the magnitude representation of the first input signal and the magnitude representation of the second input signal to tend to become more similar to one another. For example, either the magnitude components can be made more similar before an error or cost function is derived, or the error or cost function itself can be made to penalise differences and/or encourage similarity.

Figure 7:
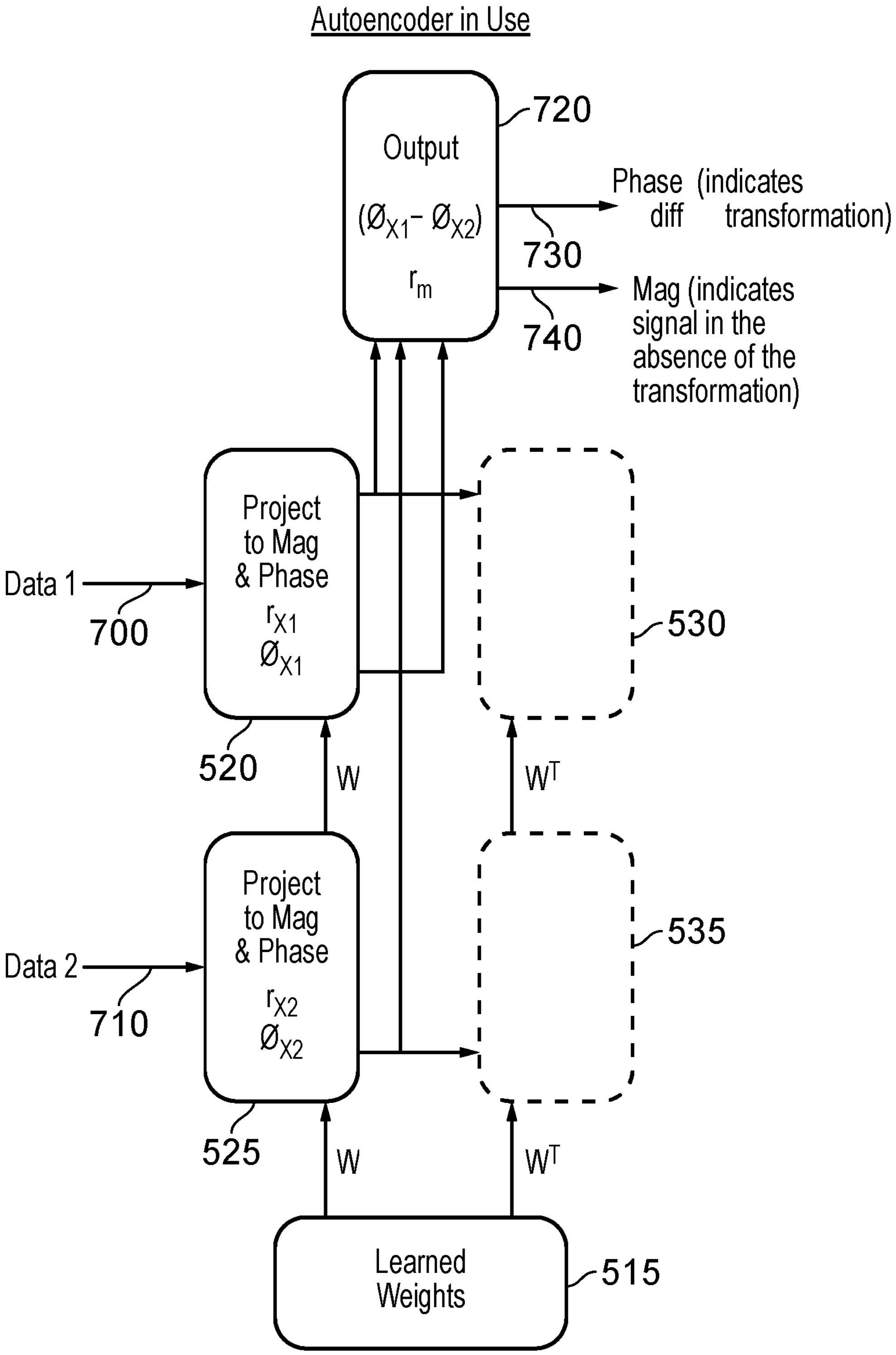
FIG. 7 schematically illustrates aspects of an inference process.

FIG. 7 schematically illustrates aspects of the inference process represented by the step 410 of FIG. 4. Here, the weights unit 515 provides the learned weights W and $W^T$, without necessarily undertaking any further learning of those weights. The projection units 520, 525 are responsive to unknown input signals 700, 710 rather than to the training data as used in FIG. 5. The reconstruction units 530, 535 are not necessarily required for the purposes described with reference to FIG. 7 and so are shown in broken line. An output unit 720 operates as discussed below.

In operation, each of the input signals 700, 710 is projected to a respective magnitude and phase representation:

signal 700: $r_{x1}$, $\phi_{x1}$ signal 710:

in response to the learned weights.

The 2 phase representations are passed to the output circuitry 720 which generates a phase difference $(\phi_{x1}-\phi_{x2})$ 730 which may be passed to the classification system 250 and which is indicative of one or more transformations which exist as the signals represented by the two input signals 700 and 710. Also, one or both of the magnitude representations (shown generically as $r_n$) is provided to the output unit 720 which outputs it as a magnitude output 740 forming the output 240 of FIG. 2 indicative of the signal in the absence of the transformation, which may also be passed to the classification system 250.

Figure 8:
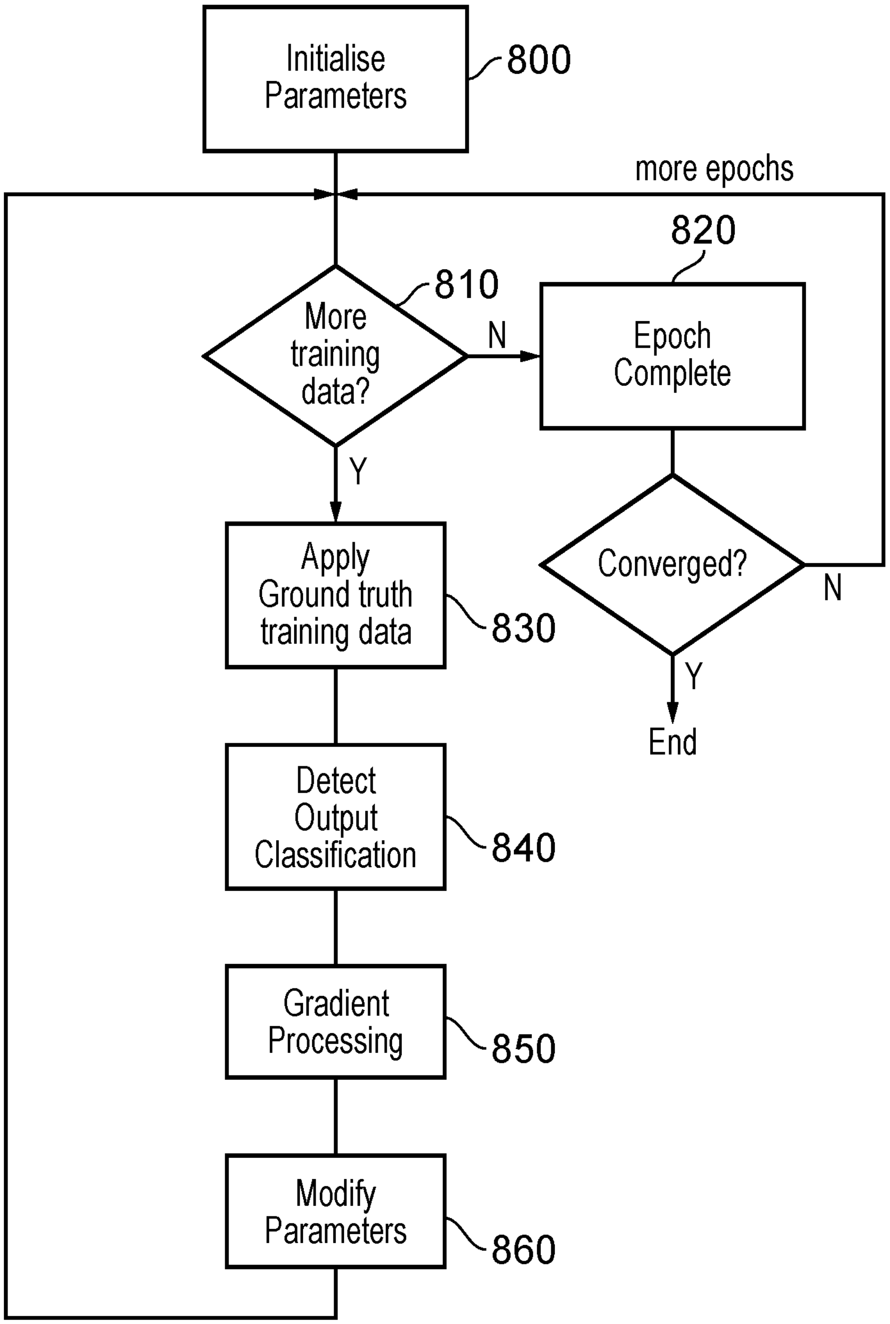
FIG. 8 is a schematic flowchart illustrating a method.

FIG. 8 relates to the operation of the classification system 250 which, as discussed, may also be an ANN. This makes use of trained parameters such as weights to derive an indication 270 classifying a transformation detecting auto-encoder 210 (or indeed more than one transformation) as being present between the test signals 700, 710. An analogous classification system can make use of indication 272, a transformation-invariant representation of any of the two input signals, in order to classify signals in the absence of the learned transformations. In order to train the parameters associated with the classification system 250, a first step 800 involves initialising those parameters.

A looped operation for an epoch then proceeds as long as there is more training data to be used, as detected at a step 810. Once there is no more training data available in a particular epoch (and training of an ANN may use, say, 50-10000 epochs), the epoch is complete at a step 820. If there are further epochs at a step 825, for example because the ANN parameters are not yet sufficiently converged, then control returns to the looped operation via the step 810; if not then the process ends.

Assuming that there is more training data, then so-called ground truth training data is provided to the classification system indicative of known transformations at a step 830. At a step 840 the output classification is generated by the autoencoder system. At a step 850 so-called gradient descent or other processing may be applied (as one example of a parameter training operation) so as to detect the manner in which the parameters or weights of the classification system should be varied in order to reduce the error between the output classification 270 and the ground truth classification of the actual data. Then, at a step 860, the parameters of the classification system are modified and the process repeats.

Embodiments of the present disclosure include the trained auto-encoder 210 as well as the training process, and data processing apparatus to implement one or more of the training process, the auto-encoder during training, the trained auto-encoder and/or the classification system, as well as computer software to implement any of the methods discussed here and a medium such as a non-transitory machine-readable medium which stores such computer software.

Figure 9:
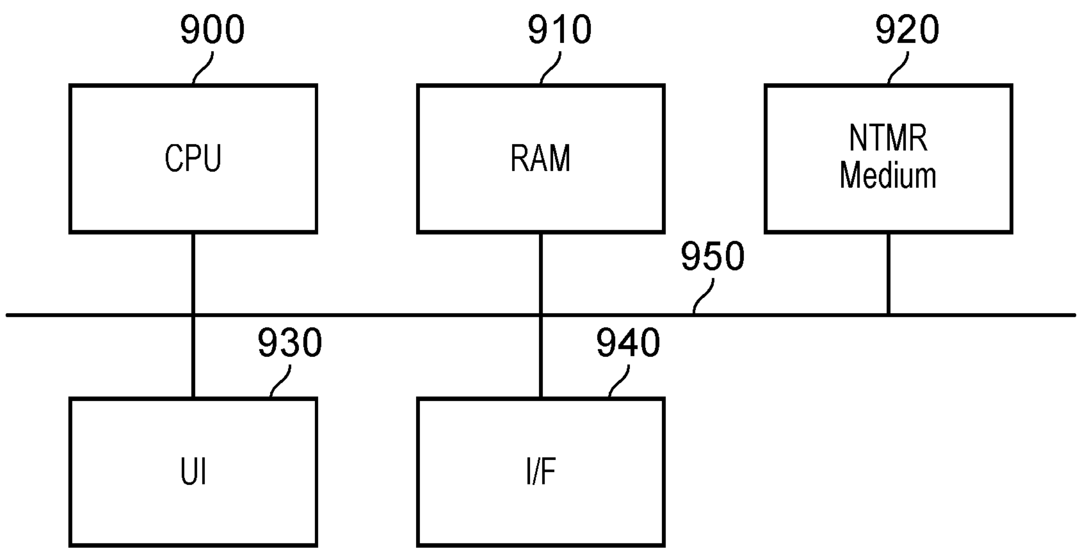
FIGS. 9 and 10 schematically illustrate respective data processing systems.

FIG. 9 schematically illustrates a data processing apparatus suitable to carry out the methods discussed above and in particular to implement one or both of the auto-encoder and the classification system, comprising a central processing unit or CPU 900, a random access memory (RAM) 910, a non-transitory machine-readable memory or medium (NTMRM) 920 such as a flash memory, a hard disc drive or the like, a user interface such as a display, keyboard, mouse, or the like 930, and an input/output interface 940. These components are linked together by a bus structure 950. The CPU 900 can perform any of the above methods under the control of program instructions stored in the RAM 910 and/or the NTMRM 920. The NTMRM 920 therefore provides an example of a non-transitory machine-readable medium which stores computer software by which the CPU 900 perform the method or methods discussed above.

Figure 10:
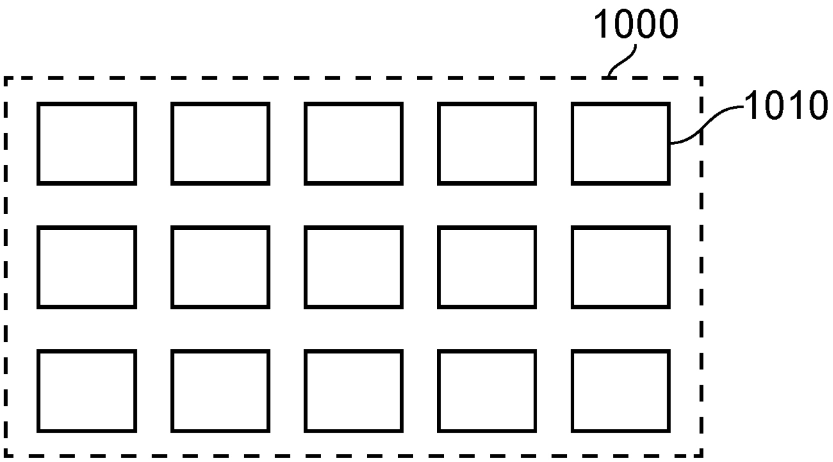

FIG. 10 schematically illustrates another example apparatus 1000 comprising an array of interconnected processing elements 1010 (each of which may be similar in function to the CPU 1000 of FIG. 10) for implementing an ANN. The apparatus of FIG. 10 can therefore provide an example of data processing apparatus comprising one or more processing elements to implement one or both of the ANNs discussed above.

Figure 11:
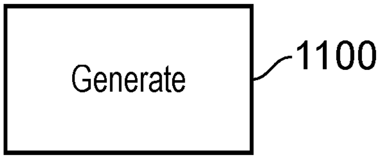
FIG. 11 is a schematic flowchart illustrating a method.

FIG. 11 is a schematic flowchart representing a method of signal processing comprising:

generating (at a step 1100) a representation of first and second input signals, the representation having a first component which is dependent upon one or more transformations, of a set of transformations, between the first and second input signals and a second component which is independent of the one or more transformations.

For example, and as discussed above, the generating step 1100 may comprise generating the representation in a complex-value space. For example, the first component may be represented by a rotation angle in the complex-value space and the second component may be represented by a magnitude in the complex-value space. Conveniently, the generating step 1100 may comprise detecting components of the representation with respect to eigenvectors of the set of transformations in the complex-value space, the eigenvectors for a given transformation being vectors in the complex-value space which do not change their vector direction when the given transformation is applied.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Similarly, a data signal comprising coded data generated according to the methods discussed above (whether or not embodied on a non-transitory machine-readable medium) is also considered to represent an embodiment of the present disclosure.

It will be apparent that numerous modifications and variations of the present disclosure are possible in light of the above teachings. It is therefore to be understood that within the scope of the appended clauses, the technology may be practised otherwise than as specifically described herein.

Various respective aspects and features will be defined by the following numbered clauses:

Clause 1. A computer-implemented method of training an artificial neural network (ANN) by generating one or more learned parameters for use during a subsequent inference phase of the trained ANN, the method comprising:

providing training data representing first and second input signals, the second input signal exhibiting one or more transformations relative to the first signal selected from a set of transformations;

using the ANN and in response to the one or more parameters, generating a magnitude and phase representation of each of the first and second input signals; and training the one or more parameters, in dependence upon a constraint which causes the magnitude representation of the first input signal and the magnitude representation of the second input signal to tend to become more similar to one another, the training step comprising:

detecting an error signal; and updating the one or more parameters in dependence upon the error signal.

Clause 2. A method according to clause 1, in which the training step comprises:

using the ANN and in response to the one or more parameters, generating a first output signal in dependence upon the phase representation of the first input signal and the magnitude representation of the second input signal, and generating a second output signal in dependence upon the phase representation of the second input signal and the magnitude representation of the first input signal; and in which the detecting step comprises:

detecting a reconstruction error between at least one of the first and second output signals and at least one of the first and second input signals.

Clause 3. A method according to clause 1 or clause 2, in which the ANN is an autoencoder having at least:

an input layer;

one or more encoding layers configured to perform the step of generating the magnitude and phase representation;

one or more representational layers;

one or more decoding layers configured to perform the step of generating the first output signal and the second output signal; and an output layer.

Clause 4. A method according to clause 3, in which the one or more representational layers comprise a smaller number of neurons than a number of neurons at a layer of the one or more encoding layers or a layer of the one or more decoding layers.

Clause 5. A method according to clause 3 or clause 4, in which the ANN is configured to represent the first and second input signals as real and imaginary components at the one or more representational layers.

Clause 6. A method according to any one of clauses 3 to 5, in which the ANN is configured to represent the first and second input signals as the magnitude and phase representation as a function of the real and imaginary components at the one or more representational layers.

Clause 7. A method according to any one of clauses 3 to 6, in which the one or more learned parameters comprise respective weighting parameters controlling encoding by the one or more encoding layers and decoding by the one or more decoding layers.

Clause 8. A method according to clause 7, in which the one or more learned parameters comprise respective weighting matrices controlling encoding by the one or more encoding layers, a transposition of the weighting matrices controlling decoding by the one or more decoding layers.

Clause 9. A method according to clause 8, in which for a vector x of values of the first input signal and a vector of values ψ(x) of the second input signal and weighting matrices $W_{Re}$ for the real component and $W_{in}$, for the imaginary component, the one or more encoding layers are configured to encode a respective magnitude representation $r_x$, and $r_{\psi(x)}$ and a respective phase representation $\phi_x$, and $\phi_{\psi(x)}$ as:

$$r_x=\sqrt{((W_{Re}x)^2+(W_{Im}x)^2)};$$

$$r_{\psi(x)}=\sqrt{((W_{Re}\psi(x))^2+(W_{Im}\psi)(x))^2)};$$

$$\phi_x=\text{atan }2(W_{Re}x, W_{Im}x); \text{ and}$$

$$\phi_{\psi(x)}=\text{atan }2(W_{Re}\psi(x), W_{Im}\psi(x));$$

where atan 2 is the two-argument arctangent function.

Clause 10. A method according to clause 9, in which the first output signal is derived as:

$$x_{output1}=W^T_{Re}(r_{\psi(x)}\cdot\sin\phi_x)+W^T_{Im}(r_{\psi(x)}\cdot\cos\phi_x);$$

and the second output signal is derived as:

$$x_{output2}=W^T_{Re}(r_x\cdot\sin\phi_{\psi(x)})+W^T_{Im}(r_x\cdot\cos\phi_{\psi(x)});$$

where $W^T$ represents a transposition of the respective matrix W and the "dot" represents a Hadamard (entrywise) product.

Clause 11. A method according to clause 10, in which the detecting step comprises detecting an error function across available values of x, $x_{output1}$, ψ(x) and $x_{output2}$ as:

$$\text{error}=\Sigma(x-x_{output1})^p+\Sigma(x)-x_{output2})^p \text{ where } p \text{ is at least 1}$$

Clause 12. A method according to any one of the preceding clauses, in which the first and second input signals represent windows of audio signals.

Clause 13. A method according to clause 12, in which the audio signals comprise time-frequency representations of audio content.

Clause 14. A method according to clause 12 or clause 13, comprising the step of generating the second input signal by applying a transformation to the first input signal.

Clause 15. A method according to clause 14, in which the set of transformations comprises a set of orthogonal transforms.

Clause 16. A method according to clause 15, in which the set of transformations comprises one or more selected from the list consisting of:

a time shift between the first and second input signals;

a tempo difference between a periodic sound represented by the first and second audio signals; and a pitch transposition between sounds represented by the first and second audio signals.

Clause 17. An artificial neural network (ANN) trained by the method of any one of the preceding clauses.

Clause 18 Data processing apparatus configured to implement the ANN of clause 17.

Clause 19. An audio processing system comprising:

an analyser configured to generate magnitude and phase representations of first and second input signals, the phase representations depending upon one or more transformations, selected from a set of transformations, between the first and second input signals and the magnitude representations being independent of the one or more transformations;

an output configured to acquire the magnitude and phase representations of the first and second input signals and to output one or both of:

a phase difference between phases represented by the respective phase representations, the phase difference being indicative of the one or more transformations between the first and second input signals; and one or more of the magnitude representations, the one or more magnitude representations being indicative of the first and second input signals in the absence of the transformation.

Clause 20. A system according to clause 19, in which the analyser comprises an artificial neural network (ANN).

Clause 21. A system according to clause 20, in which the analyser comprises an artificial neural network (ANN) trained according to the method of clause 1 using the set of transformations Clause 22. A system according to any one of clauses 19 to 21, comprising a classification ANN configured to detect one or more transformations in response to the phase difference.

Clause 23 A system according to clause 20, in which the analyser comprises an artificial neural network (ANN) trained according to the method of clause 1 using the one or more magnitude representations.

Clause 24. A system according to clause 19 or clause 20, comprising a classification ANN configured to detect one or more signals in response to the one or more magnitude representations. 25. Data processing apparatus configured to implement the system of any one of clauses 19 to 24.

Clause 26. An auto-encoder comprising:

one or more encoding layers;

one or more representational layers; and one or more decoding layers;

in which the one or more encoding layers, the one or more representational layers and the one or more decoding layers are configured to cooperate to provide a representation of first and second input signals at the one or more representational layers having a first component which is dependent upon one or more transformations, of a set of transformations, between the first and second input signals and a second component which is independent of the one or more transformations.

Clause 27. An auto-encoder according to clause 26, in which the first component is a phase component and the second component is a magnitude component of the respective input signal.

Clause 28. An auto-encoder according to clause 26 or clause 27, in which the first and second input signals are audio signals.

Clause 29. A method of signal processing comprising:

generating a representation of first and second input signals, the representation having a first component which is dependent upon one or more transformations, of a set of transformations, between the first and second input signals and a second component which is independent of the one or more transformations.

Clause 30. A method according to clause 29, in which the first and second input signals are audio signals, the method comprising:

detecting similarities between the first and second input signals in dependence upon the generated first and second components.

Clause 31. A method according to clause 29 or clause 30, in which the generating step comprises generating the representation in a complex-value space.

Clause 32. A method according to clause 31, in which the first component is represented by a rotation angle in the complex-value space and the second component is represented by a magnitude in the complex-value space.

Clause 33. A method according to clause 31 or clause 32, in which the generating step comprises detecting components of the representation with respect to eigenvectors of the set of transformations in the complex-value space, the eigenvectors for a given transformation being vectors in the complex-value space which do not change their vector direction when the given transformation is applied.

Clause 34. Computer software which, when executed by a computer, causes the computer to perform the method of any one of clauses 29 to 33.

The invention claimed is:

1. A computer-implemented method of training an artificial neural network (ANN) by generating one or more learned parameters for use during a subsequent inference phase of the trained ANN, the method comprising: providing training data representing first and second input signals, the second input signal exhibiting one or more transformations relative to the first signal selected from a set of transformations; using the ANN and in response to the one or more parameters, generating a magnitude and phase representation of each of the first and second input signals; and training the one or more parameters, the training step comprising: detecting an error signal; and updating the one or more parameters in dependence upon the error signal, wherein the training comprises: using the ANN and in response to the one or more parameters, generating a first output signal in dependence upon the phase representation of the first input signal and the magnitude representation of the second input signal, and generating a second output signal in dependence upon the phase representation of the second input signal and the magnitude representation of the first input signal; and the detecting comprises: detecting a reconstruction error between at least one of the first and second output signals and at least one of the first and second input signals.

2. The method according to claim 1, wherein the ANN is an autoencoder having at least: an input layer; one or more encoding layers configured to generate the magnitude and phase representations; one or more representational layers; one or more decoding layers configured to generate the first output signal and the second output signal; and an output layer.

3. The method according to claim 1, wherein the first and second input signals represent windows of audio signals.

4. The method according to claim 3, wherein the audio signals comprise time-frequency representations of audio content.

5. The method according to claim 3, further comprising generating the second input signal by applying the one or more transformations to the first input signal.

6. The method according to claim 5, wherein the set of transformations comprises a set of orthogonal transforms.

7. The method according to claim 6, wherein the set of transformations comprises one or more selected from the list consisting of: a time shift between the first and second input signals; a tempo difference between a periodic sound represented by the first and second input signals; and a pitch transposition between sounds represented by the first and second input signals.

8. An artificial neural network (ANN) trained by the method of claim 1.

9. A data processing apparatus configured to implement the ANN of claim 8.

10. An audio processing system comprising: processing circuitry configured to: receive first and second input signals; generate, using an artificial neural network, magnitude and phase representations of the first and second input signals, the phase representations depending upon one or more transformations, selected from a set of transformations, between the first and second input signals and the magnitude representations being independent of the one or more transformations; and output one or both of: a phase difference between phases represented by the respective phase representations, the phase difference being indicative of the one or more transformations between the first and second input signals;

and one or more of the magnitude representations, the one or more magnitude representations being indicative of the first and second input signals in the absence of the one or more transformations.

11. The system according to claim 10, further comprising a classification ANN configured to detect the one or more transformations in response to the phase difference.

12. The system according to claim 10, further comprising a classification ANN configured to detect one or more signals in response to the one or more magnitude representations.

13. A data processing apparatus configured to implement the system of claim 10.

14. An auto-encoder comprising: one or more encoding layers; one or more representational layers; and one or more decoding layers; in which the one or more encoding layers, the one or more representational layers and the one or more decoding layers are configured to cooperate as an artificial neural network to provide a representation of first and second input signals at the one or more representational layers having a first component which is dependent upon one or more transformations, of a set of transformations, between the first and second input signals and a second component which is independent of the one or more transformations.

15. The auto-encoder according to claim 14, wherein the first component is a phase component and the second component is a magnitude component of the respective input signals.

16. The auto-encoder according to claim 14, wherein the first and second input signals are audio signals.

17. A method of signal processing comprising: receiving first and second input signals; and generating, using an artificial neural network including an autoencoder having one or more encoding layers, one or more representational layers, and one or more decoding layers, a representation of the first and second input signals in a complex-value space, the representation having a first component represented by a rotation angle in the complex-value space which is dependent upon one or more transformations, of a set of transformations, between the first and second input signals and a second component represented by a magnitude in the complex-value space which is independent of the one or more transformations.

18. The method according to claim 17, wherein the first and second input signals are audio signals, and the method further comprises detecting similarities between the first and second input signals in dependence upon the generated first and second components.

19. The method according to claim 17, wherein the generating comprises detecting components of the representation with respect to eigenvectors of the set of transformations in the complex-value space, the eigenvectors for a given transformation being vectors in the complex-value space which do not change their vector direction when the given transformation is applied.

20. A non-transitory computer readable medium storing instructions which, when executed by a computer, causes the computer to perform the method of claim 17.

* * * * *